| (12) United States Patent | (10) Patent No.: US 9,016,042 B2 |
|---|---|
| Chiou et al. | (45) Date of Patent: Apr. 28, 2015 |

(54) REINFORCEMENT MEMBERS FOR AIRCRAFT PROPULSION SYSTEM COMPONENTS CONFIGURED TO ADDRESS DELAMINATION OF THE INNER FIXED STRUCTURE

(75) Inventors: Song Chiou, Cerritos, CA (US); Jia Yu, San Diego, CA (US); Claude Hubert, Riverside, CA (US); Michael Layland, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 43 days.

(21) Appl. No.: 13/470,049

(22) Filed: May 11, 2012

(65) Prior Publication Data

US 2012/0291416 A1 Nov. 22, 2012

Related U.S. Application Data

(60) Provisional application No. 61/488,659, filed on May 20, 2011.

(51) Int. Cl.
| *F02K 3/02* | (2006.01) |
| *F01D 25/00* | (2006.01) |
| *F02K 1/60* | (2006.01) |
| *F02K 1/64* | (2006.01) |
| *F02K 1/82* | (2006.01) |
| *F02K 1/72* | (2006.01) |

(52) U.S. Cl.
CPC . *F01D 25/00* (2013.01); *F02K 1/60* (2013.01); *F02K 1/64* (2013.01); *F02K 1/827* (2013.01); *F05D 2300/702* (2013.01); *F02K 1/72* (2013.01); *F05D 2250/75* (2013.01); *F05D 2300/603* (2013.01); *Y02T 50/672* (2013.01)

(58) Field of Classification Search
CPC ............. B64D 33/02; B64D 2033/026; B64D 2033/0286; B64F 1/26; F02C 7/04; F02C 7/042; F02K 1/60; F02K 1/64; F02K 1/72; F02K 1/827; F05D 2300/603; F05D 2300/702; F05D 2250/75; F01D 25/00
USPC ............ 137/15.1; 244/53 B, 110 B; 181/241, 181/222; 60/226.1, 226.2; 239/265.31; 415/9, 220
See application file for complete search history.

(56) References Cited

U.S. PATENT DOCUMENTS

| 3,297,238 A | 1/1967 | Sherman |
| 3,519,228 A | 7/1970 | Windecker |

(Continued)

FOREIGN PATENT DOCUMENTS

| EP | 1880941 A2 | 1/2008 | |
| EP | 2186729 A1 * | 5/2010 | ............. B64D 33/02 |

(Continued)

OTHER PUBLICATIONS

Search Report dated Mar. 23, 2010 issued in related EP application (No. 09014080.7).

(Continued)

*Primary Examiner* — Ehud Gartenberg
*Assistant Examiner* — Lorne Meade
(74) *Attorney, Agent, or Firm* — Snell & Wilmer L.L.P.

(57) ABSTRACT

An inner fixed structure of a thrust reverser includes an inner skin, an outer skin, a cellular core disposed between the inner skin and the outer skin, and at least one crack and delamination stopper extending radially between the inner skin and the outer skin.

11 Claims, 14 Drawing Sheets

(56) References Cited

U.S. PATENT DOCUMENTS

| | | | |
|---|---|---|---|
| 3,974,313 A * | 8/1976 | James | 428/176 |
| 4,150,732 A | 4/1979 | Hoch et al. | |
| 4,215,536 A | 8/1980 | Rudolph | |
| 4,416,349 A | 11/1983 | Jacobs | |
| 4,425,980 A | 1/1984 | Miles | |
| 4,449,607 A | 5/1984 | Forestier et al. | |
| 4,452,563 A | 6/1984 | Belanger et al. | |
| 4,452,565 A | 6/1984 | Monhardt et al. | |
| 4,492,607 A | 1/1985 | Halcomb | |
| 4,671,470 A | 6/1987 | Jonas | |
| 4,751,979 A | 6/1988 | Wiseman | |
| 4,944,362 A | 7/1990 | Motsinger et al. | |
| 4,966,802 A | 10/1990 | Hertzberg | |
| 4,979,587 A | 12/1990 | Hirt et al. | |
| 5,000,399 A | 3/1991 | Readnour et al. | |
| 5,083,426 A * | 1/1992 | Layland | 60/226.1 |
| 5,157,915 A * | 10/1992 | Bart | 60/226.1 |
| 5,297,760 A | 3/1994 | Hart-Smith | |
| 5,543,198 A | 8/1996 | Wilson | |
| 5,592,813 A | 1/1997 | Webb | |
| 5,609,313 A | 3/1997 | Cole et al. | |
| 5,658,024 A | 8/1997 | Bachmann et al. | |
| 5,779,193 A | 7/1998 | Sloan | |
| 5,941,061 A | 8/1999 | Sherry et al. | |
| 6,123,170 A | 9/2000 | Porte et al. | |
| 6,328,258 B1 | 12/2001 | Porte | |
| 6,328,261 B1 | 12/2001 | Wollaston et al. | |
| 6,340,135 B1 | 1/2002 | Barton | |
| 6,530,221 B1 | 3/2003 | Sattinger et al. | |
| 6,761,245 B2 | 7/2004 | Porte | |
| 6,857,669 B2 | 2/2005 | Porte et al. | |
| 7,021,856 B2 | 4/2006 | Assler et al. | |
| 7,040,575 B2 | 5/2006 | Struve et al. | |
| 7,083,147 B2 | 8/2006 | Movsesian et al. | |
| 7,197,852 B2 * | 4/2007 | Grillos | 52/144 |
| 7,296,655 B2 | 11/2007 | Costa et al. | |
| 7,328,771 B2 | 2/2008 | Costa et al. | |
| 7,334,393 B2 | 2/2008 | Porte | |
| 7,383,679 B2 | 6/2008 | Porte et al. | |
| 7,503,425 B2 | 3/2009 | Strunk | |
| 7,578,468 B2 * | 8/2009 | Drost | 244/117 R |
| 7,588,212 B2 * | 9/2009 | Moe et al. | 244/134 D |
| 7,798,285 B2 * | 9/2010 | Chiou et al. | 181/213 |
| 7,921,966 B2 * | 4/2011 | Chiou et al. | 181/292 |
| 2004/0045765 A1 | 3/2004 | Porte | |
| 2007/0039284 A1 | 2/2007 | Royo et al. | |
| 2007/0062022 A1 | 3/2007 | Douglas et al. | |
| 2008/0017442 A1 | 1/2008 | Douglas | |
| 2008/0179448 A1 | 7/2008 | Layland et al. | |
| 2008/0253883 A1 * | 10/2008 | Pool et al. | 415/200 |
| 2010/0133380 A1 | 6/2010 | Roebroeks et al. | |
| 2012/0291416 A1 * | 11/2012 | Chiou et al. | 60/226.2 |
| 2013/0129483 A1 * | 5/2013 | Chiou et al. | 415/119 |

FOREIGN PATENT DOCUMENTS

| | | |
|---|---|---|
| GB | 2273131 | 6/1994 |
| WO | WO 92/00183 A1 | 1/1992 |

OTHER PUBLICATIONS

Office Action dated Oct. 25, 2013 in U.S. Appl. No. 13/723,095.
Final Office Action dated Feb. 20, 2014 in U.S. Appl. No. 13/723,095.
Advisory Action dated Apr. 29, 2014 in U.S. Appl. No. 13/723,095.

* cited by examiner

REINFORCEMENT MEMBERS FOR AIRCRAFT PROPULSION SYSTEM COMPONENTS CONFIGURED TO ADDRESS DELAMINATION OF THE INNER FIXED STRUCTURE

RELATED APPLICATIONS

This application claims priority to U.S. Provisional Patent Application No. 61/488,659, filed 20 May 2011, the contents of which are incorporated by reference in their entirety.

BACKGROUND

When a "blade-out" event occurs in an aircraft engine, it is critical that the aircraft have "fly-home" capability (i.e., the ability to return safely to the ground under FAA rules). Similarly, when one layer of a multilayer component of an aircraft propulsion system becomes disbonded from another layer, it is again critical that the aircraft be able to fly home. The ability of an aircraft propulsion system component, such as a nacelle or the inner fixed structure of a thrust reverser, to tolerate damage and maintain structural integrity during a blade-out event, disbonding of layers, or other failure mode, is critical to the fly-home capability of an aircraft.

SUMMARY

The disclosure concerns protective structures for aircraft propulsion system components, which are designed to limit cracking, disbond, and delamination, thereby improving the fly-home capability of an aircraft.

According to certain embodiments, the component is an acoustic inner barrel. The inner acoustic barrel may include: an annular inner skin; an annular outer skin; an annular acoustic cellular core assembly disposed between the inner skin and the outer skin; and at least two reinforcement members extending radially from the inner skin, through the acoustic cellular core, and to the outer skin. The inner skin, outer skin, acoustic cellular core assembly and the at least two or more reinforcement members may be bonded together to form a 360-degree, one-piece annular structure and still maintain acoustic smoothness requirements of the barrel.

According to certain other embodiments, the component is an inner fixed structure (IFS) of a thrust reverser. The IFS includes an inner skin, an outer skin, an acoustic cellular core assembly disposed between the inner skin and the outer skin, and a reinforcement lattice comprising a plurality of reinforcement members extending in a thickness direction through the cellular core between the inner skin and the outer skin. Each of the reinforcement members also extends in lateral direction of the cellular core, lateral directions associated with a first set of reinforcement members intersecting lateral directions associated with a second set of reinforcement members to thereby form the reinforcement lattice.

In some embodiments, the IFS may have a "clamshell" configuration comprising two complementary halves.

In some embodiments, the reinforcement lattice may be found only along an enlarged barrel portion of the IFS.

The reinforcement members may take on different cross-sectional shapes, such as a T-shaped cross-section, an I-shaped cross-section, an L-shaped cross-section, a Z-shaped cross section, a C-shaped cross section, in a lateral direction of the cellular core.

The reinforcement member may have a first end segment secured between an acoustic cellular core and an innermost surface of the inner skin, and a central segment adhesively boned to the core.

The reinforcement members may be bonded only to an imperforate inner skin and not bonded to a perforated outer skin.

Additional features and advantages of the invention are provided in the following detailed description and appended drawings.

DETAILED DESCRIPTION OF THE INVENTION

Figure 1:
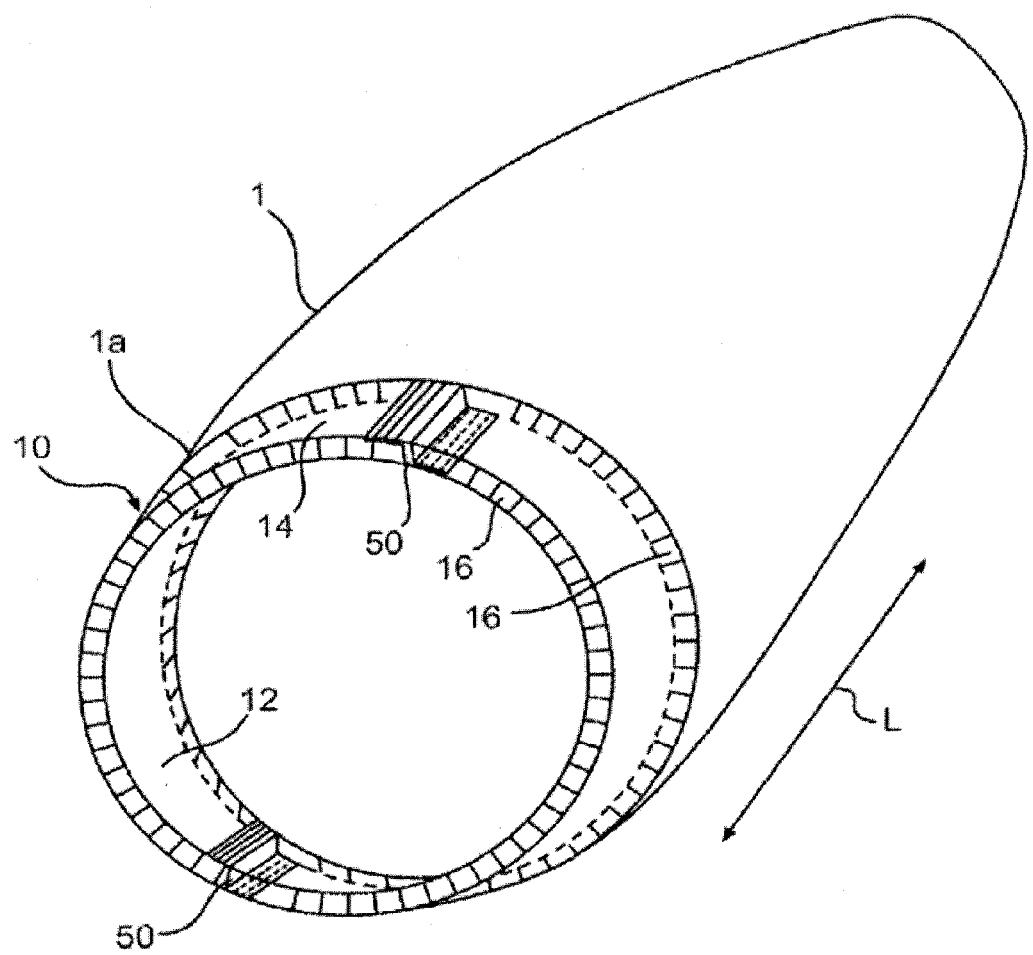
FIG. 1 shows a portion of an aircraft engine nacelle having an inlet including an acoustic inner barrel according to one embodiment of the invention.
Figure 2:
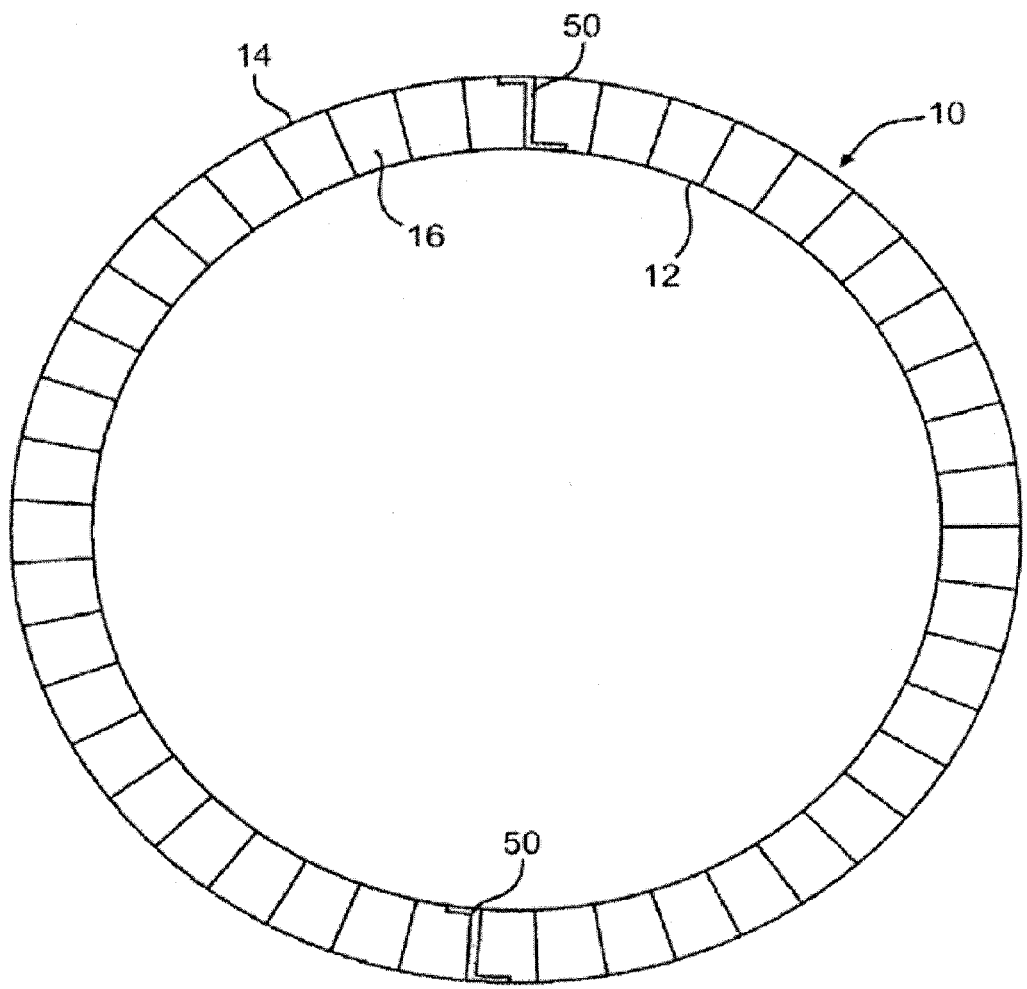
FIG. 2 is a cross-sectional view of the acoustic inner barrel of FIG. 1.

FIG. 1 shows a portion of an aircraft engine nacelle 1 including an acoustic inner barrel 10 at its inlet 1a, according to one embodiment of the invention. As shown in FIGS. 1 and 2, the barrel 10 has a 360-degree, one-piece annular construction. The barrel 10 includes an annular, perforated inner face sheet or inner skin 12, an annular, imperforate outer face sheet or outer skin 14 radially spaced from the inner skin 12, and an acoustic cellular core 16 disposed between the inner skin 12 and the outer skin 14. The term "annular" includes constructions having varying diameters and shapes along the length L (FIG. 1) of the nacelle 1, and is not intended to be limited to right cylinders. The inner skin 12, outer skin 14 and cellular core 16 may be constructed of a composite material, such as graphite-epoxy, or the like. The inner skin 12 and outer skin 14 are bonded to the core 16 by an adhesive such as Henkel Epoxy Adhesive EA 9258.1, or another adhesive material having comparable peel and shear strengths, so as to have a 360-degree, one-piece construction. The core 16 may have a single-degree-of-freedom arrangement, a double-degree-of-freedom or a different multiple-degree-of-freedom arrangement of a type known to persons of ordinary skill in the art.

As shown in FIGS. 1 and 2, the barrel 10 includes two crack and delamination stoppers, or reinforcement members 50 disposed approximately 180 degrees apart around the circumference of the barrel 10. The reinforcement members 50 extend radially from the inner skin 12, through the core 16 and to the outer skin 14. The reinforcement members 50 reinforce the skins 12, 14 and the core 16, and serve to limit delamination and cracking of the barrel 10 during accidents, such as a blade-out events, that may otherwise inflict structural damage on the nacelle 1. The reinforcement members 50 may be made of a suitably strong, lightweight material. A composite material, such as graphite-epoxy, is preferable, although metallic materials, such as aluminum or titanium, may also be used. Although two reinforcement members 50 are shown, any number and spacing of reinforcement members may be used, depending on structural needs. Where multiple reinforcement members 50 are employed, it is preferable that the reinforcement members 50 be uniformly spaced around the circumference of the barrel 10. For example, three reinforcement members 50 may be provided at approximately 120-degree spacing around the circumference of the barrel 10, or four reinforcement members 50 may be provided at approximately 90-degree spacing around the circumference of the barrel 10. It is also possible to place the reinforcement members 50 at non-uniform spacings around the barrel 10, to accommodate non-uniform structural requirements of the barrel 10.

Figure 3A:
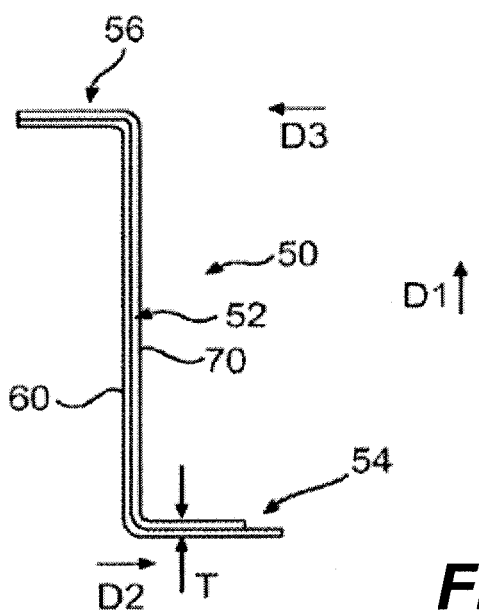
FIG. 3A is an enlarged view of a portion of the acoustic inner barrel of FIG. 2.
Figure 3B:
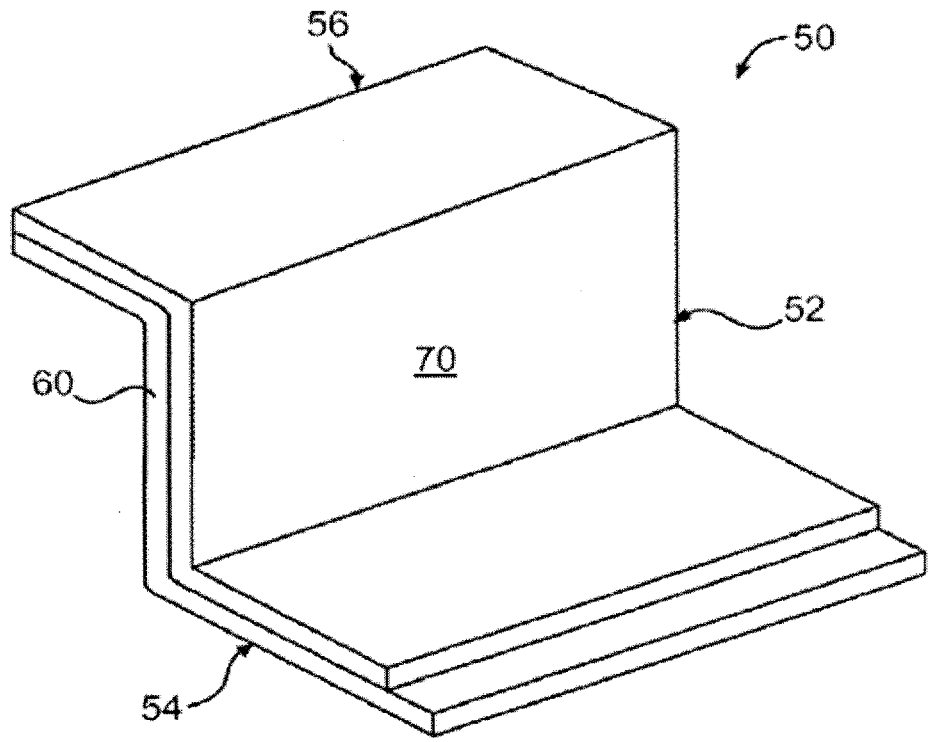
FIG. 3B is a perspective view of a crack and delamination stopper for the inner barrel of FIGS. 2 and 3A.

Referring to FIGS. 3A and 3B, each reinforcement member 50 has an essentially Z-shaped cross-section in the axial direction (into the page) of the barrel 10, and includes a central segment 52 extending in a first direction D1, a first end segment 54 extending from a first end of the central segment 52 in a second direction D2 transversely (preferably, perpendicularly) to the first direction D1, and a second end segment 56 extending from a second end of the central segment 52 in a third direction D3 opposite the second direction D2. Each reinforcement member 50 is preferably constructed from two or more similarly shaped plies 60, 70 that are bonded together such that each channel member essentially forms a half of the reinforcement member 50. According to a preferred embodiment, the reinforcement member 50 is provided as a pre-cured composite body, wherein the plies 60, 70 are constructed of a composite material such as graphite-epoxy and bonded together by an adhesive such as 3M Scotch-Weld® Epoxy Adhesive EC-2216 B/A, or another adhesive material having comparable peel and shear strengths.

As illustrated in FIG. 3A, the ply 60 may extend beyond the ply 70 in the direction D2 at the first end segment 54 in order to promote more secure attachment of the reinforcement member 50 to the inner skin 12 the barrel 10, as will be described in more detail later. After installation in the barrel 10, the first end segment 54 is perforated (FIG. 4) so as not to adversely impact the acoustic performance of the barrel 10.

The reinforcement members 50 may generally have a thickness T (in the direction perpendicular to the length of a respective portion 52/54/56) of about 0.030-0.050 inches (0.076-0.127 cm). According to an exemplary embodiment, each ply 60, 70 is about 0.0075 inches (0.019 cm) thick. However, the thickness of the reinforcement members 50 may vary as required in a given application. Furthermore, according to an exemplary embodiment, the axial length of the reinforcement members 50 (in the direction L shown in FIG. 1) is approximately equal to the axial length of the core 16.

Although the reinforcement members 50 are shown and described as formed from two bonded plies 60, 70, such a construction is not required. The reinforcement members may be formed from a greater number of plies, the plies may be joined by means other than bonding, or the reinforcement members may have unitary one-piece construction.

Figure 4:
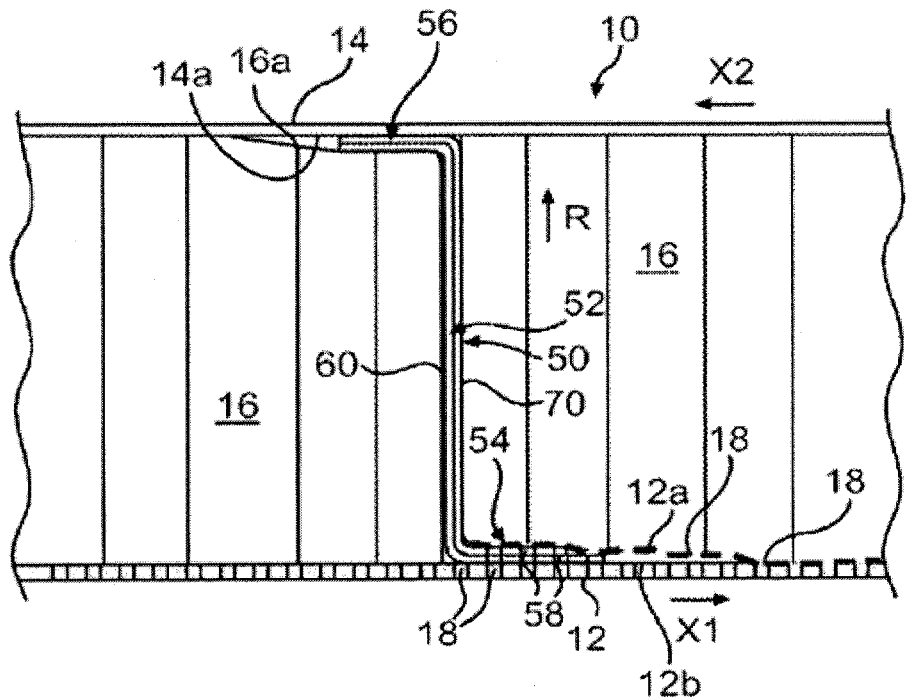
FIG. 4 is a cross-sectional view of the crack and delamination stopper of FIG. 3B.

FIG. 4 illustrates in detail the construction of the barrel 10. As shown in FIG. 4, the central segment 52 of the channel member 50 extends radially in the direction R through the core 16 of the barrel 10, the first end segment 54 of the reinforcement member 50 extends substantially parallel to the inner skin 12 in a first direction X1 and the second end segment 56 of the reinforcement member 50 extends substantially parallel to the outer skin 14 in a second direction X2. The first end segment 54 is positioned between layers 12a, 12b of the inner skin 12. The second end segment 56 is positioned between the radially outermost surface 16a of the core 16 and the radially innermost surface 14a of the outer skin 14.

The reinforcement member 50 is bonded to opposing surfaces of the barrel 10. Specifically, the central segment 52 is bonded to circumferentially opposing surfaces of the core 16, the first end segment 54 is bonded to the surrounding layers 12a, 12b of the inner skin 12, and the second end segment 56 is bonded to the radially opposing outer skin 14 and the outermost surface of the core 16. Because the ply 60 is longer than the ply 70 in the direction D2 at the first end segment 54, the surface area of the first end segment 54 is increased, thereby providing a larger bonding surface area between the first end segment 54 and the inner skin 12. The reinforcement member 50 may be bonded to the adjacent surfaces of the barrel 10 by an adhesive such as 3M Scotch-Weld® Epoxy Adhesive EC-2216 B/A, or another adhesive material having comparable peel and shear strengths.

It is noted that, in the embodiment shown in FIG. 4, the second end segment 56 is not positioned between opposing individual layers (not shown) of the outer skin 14, so that the bond between the first end segment 54 and the inner skin 12 is stronger than the bond between the second end segment 56 and the outer skin 14. Although it is possible for the second end segment 56 to be positioned between individual layers (not shown) of the outer skin 14, such a configuration is less desirable than the configuration shown in FIG. 4. It is desirable that the bonds between the reinforcement members 50 and the inner skin 12 be stronger than the bonds between the reinforcement members 50 and the outer skin 14, because such an arrangement provides optimum failure resistance characteristics. In a blade-out event, the engine fan blade will first strike the inner skin 12, so the inner skin 12 will be the first part of the barrel to take damage. When the bonds between the reinforcement members 50 and the inner skin 12 are stronger than the bonds between the reinforcement members 50 and the outer skin 14, the flow of energy from a blade-out event will follow a path extending from the inner skin 12 through a reinforcement member 50, and then into the outer skin 14. Thus, less of the energy from a blade-out event is likely to flow through a path extending around the circumference barrel 10. As a result, damage from a blade-out event is more likely to be circumferentially localized at areas of impact, and is less likely to propagate circumferentially through the barrel 10, thereby increasing the likelihood of a greater portion of the barrel remaining intact.

As shown in FIG. 4, and as well known in the art, the inner skin 12 includes perforations 18 that extend through the skin 12 to provide a desired flow of sound waves into the core 16. According to an embodiment, the first end segment 54 of the reinforcement member 50 preferably includes perforations 58 that are substantially radially aligned with the perforations 18 so as to not detrimentally affect the flow of sound waves through the perforations 18 into the core 16.

Figure 5:
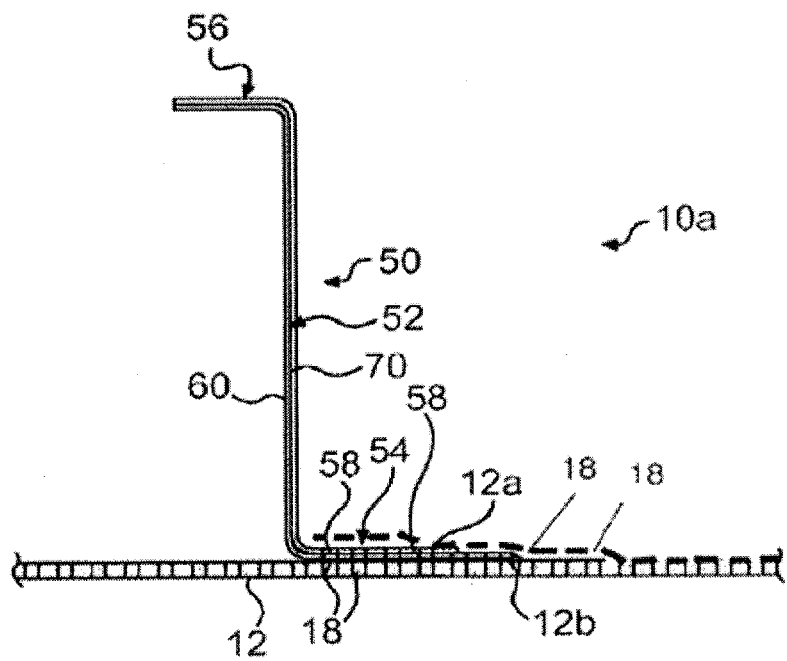
FIG. 5 illustrates an intermediate sub-assembly during the construction of the inner barrel of FIGS. 2 and 3A.

A method of assembling the barrel 10 will now be described with reference to FIGS. 4 and 5. As shown in FIG. 5, a reinforcement member 50 is integrated into the inner skin 12 by positioning the first end segment 54 between the inner skin layers 12a, 12b such that the layers 12a, 12b lie over the first end segment 54, and then applying adhesive to adjacent surfaces of the first end segment 54 and the inner skin layers 12a and 12b. One or more additional reinforcement members 50 may also be integrated into the inner skin 12 at desired locations around the periphery of the inner skin 12. Upon integrating the desired number of reinforcement members 50 into the inner skin 12, a sub-assembly 10a is formed. The sub-assembly 10a is then allowed to cure in a conventional manner. The inner skin 12 and the first end segment 54 of each reinforcement member 50 may thereafter be perforated together, such as by drilling, sand blasting or other known technologies, so as to have aligned perforations 18, 58.

Turning to FIG. 4, once the sub-assembly 10a has cured and the inner skin 12 and the first end segments 54 of the reinforcement members 50 have been perforated, the core 16 is bonded to the sub-assembly 10a using a suitable adhesive. In bonding the core 16 to the sub-assembly 10a, the core 16 is bonded to the reinforcement member 50 and the inner skin 12. After the core 16 is bonded to the sub-assembly 10a, the radially innermost surface 14a of the outer skin 14 is bonded to the core 16 and the reinforcement member 50, thereby completing the barrel 10. As indicated above, the bonding techniques employed are well known to those skilled in the art.

According to an alternative embodiment, the inner skin 12, outer skin 14, cellular core 16 and reinforcement members 50 may be bonded together in one step to form the barrel 10, and the barrel 10 may thereafter be allowed to cure. The inner skin 12 and the first end segment 54 of each reinforcement member 50 may then be perforated together so as to have aligned perforations 18, 58.

Figure 6:
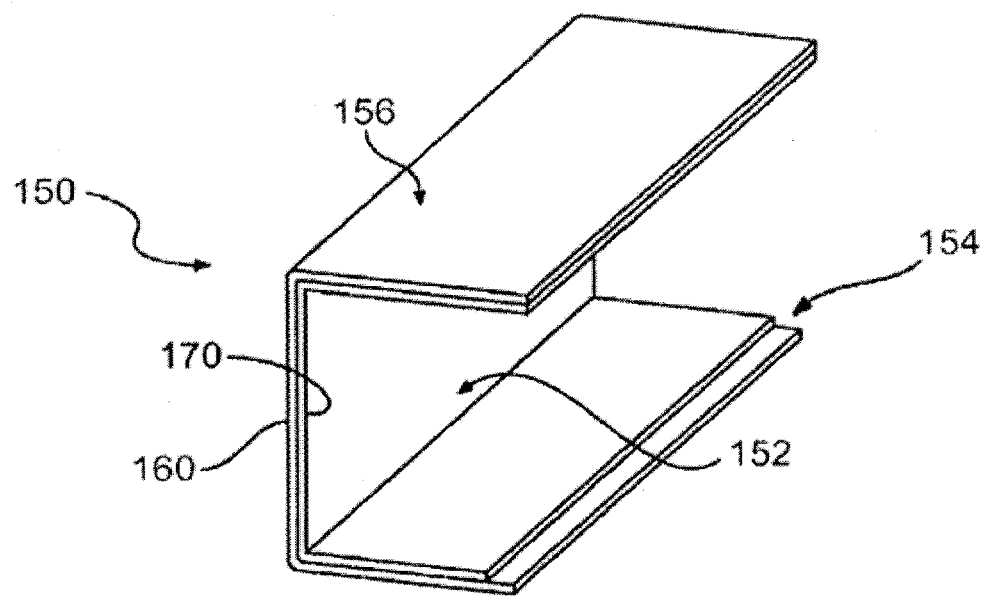
FIG. 6 is a perspective view showing a crack and delamination stopper according to another embodiment of the invention.
Figure 7:
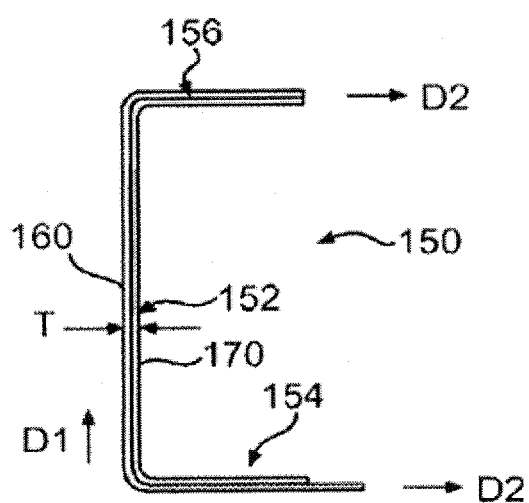
FIG. 7 is a cross-sectional view of the crack and delamination stopper of FIG. 6.

FIGS. 6 and 7 show a crack and delamination stopper or reinforcement member 150 according to another embodiment of the invention. The reinforcement member 150 may be used in place of the reinforcement member 50 shown in FIGS. 1-5. The reinforcement member 150 has an essentially C-shaped cross section in the axial direction of the barrel 10 and includes a central segment 152 extending in a first direction D1, a first end segment 154 extending from a first end of the central segment 152 in a second direction D2 transversely to the first direction D1, and a second end segment 156 extending from a second end of the central segment 152 in the second direction D2. Each reinforcement member 150 is constructed from two similarly shaped plies 160, 170 that are bonded together such that each ply 160, 170 essentially forms a half of the reinforcement member 150. As is the case with the embodiment of FIGS. 1-5, the reinforcement member 150 is provided as a pre-cured composite body.

Figure 8:
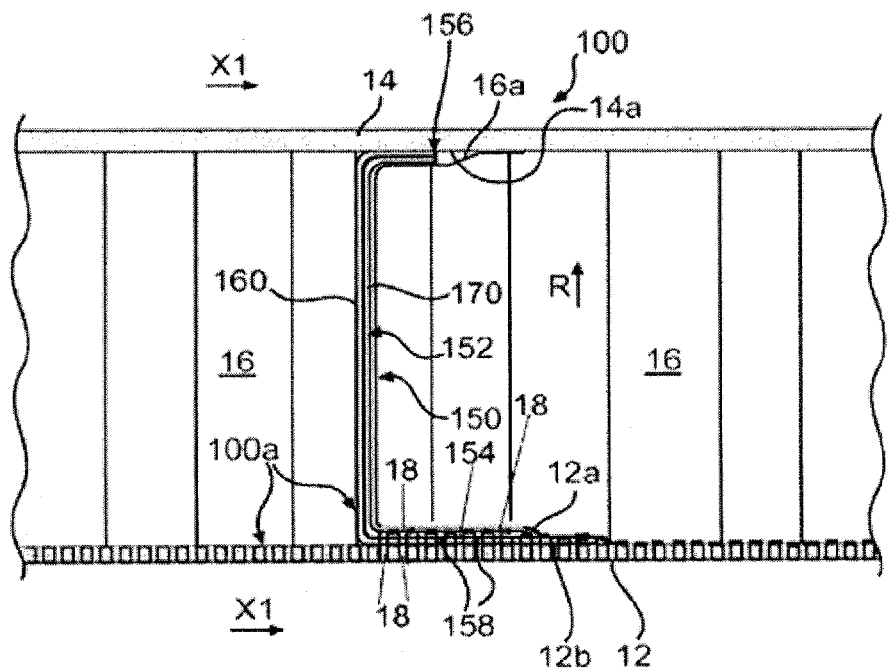
FIG. 8 is an enlarged cross-sectional view of an acoustic inner barrel including the crack and delamination stopper of FIGS. 6 and 7.

As shown in FIG. 7, the ply 160 may be longer than the ply 170 in the direction D2 at the first end segment 154 in order to promote more secure integration of the reinforcement member 150 into a barrel 100 (FIG. 8).

As is the case in the embodiment of FIGS. 1-5, the reinforcement member 150 may generally have a thickness T (in the direction perpendicular to the length of a respective portion 152/154/156) of about 0.030 to 0.050 inches (0.076-0.127 cm). However, the thickness of the reinforcement member 150 may vary based upon the requirements of a particular application. Additionally, the reinforcement member 150 may be formed from a different number of plies, the plies may be joined by means other than bonding, or the reinforcement members may have unitary one-piece construction. The axial length of the reinforcement member 150 (in the direction L shown in FIG. 1) may be approximately equal to the axial length of the core 16.

FIG. 8 shows the construction of the barrel 100 including at least one reinforcement member 150. As shown in FIG. 8, the central segment 152 of the reinforcement member 150 extends radially in the direction R through the core 16 of the barrel 100, the first end segment 154 of the reinforcement member 150 extends substantially parallel to the inner skin 12 in a first direction X1 and the second end segment 156 of the reinforcement member 150 extends substantially parallel to the outer skin 14 in the direction X1. The first end segment 154 is positioned between layers 12a, 12b of the inner skin 12. The second end segment 156 is positioned between the radially outermost surface 16a of the core 16 and the radially innermost surface 14a of the outer skin 14. The second end segment 156 may alternatively be positioned between individual layers (not shown) of the outer skin 14, in a similar fashion to the bonding of the first end segment 154 between the layers 12a, 12b of the inner skin 12. However, as is the case with the previously described barrel 10, it is preferable that the second end segment 156 not be positioned between individual layers of the outer skin 14, so that the bond between the reinforcement member 150 and the inner skin 12 is stronger than the bond between the reinforcement member 150 and the outer skin 14. Preferably, when the reinforcement member 150 is integrated into the barrel 100, the first end segment 154 of the reinforcement member 150 is provided with perforations 158 that are aligned with the perforations 18 in the inner skin 12.

The reinforcement member 150 is integrated into the inner skin 12 by positioning the first end segment 154 between the inner skin layers 12a, 12b such that the layers 12a, 12b lie over the first end segment 154, and applying adhesive to adjacent surfaces of the first end segment 154 and the inner skin layers 12a and 12b. One or more additional reinforcement members 150 may also be integrated into the inner skin 12 at desired locations around the periphery of the inner skin 12. Upon installing the desired number of reinforcement members 150 into the inner skin 12, a sub-assembly 100a including the inner skin 12 and the reinforcement members 150 is formed. The sub-assembly 100a is then allowed to cure. The inner skin 12 and the first end segment 154 of each reinforcement member 50 may thereafter be perforated together so as to have aligned perforations 18, 158. Once the sub-assembly 100a has cured and the inner skin 12 and the first end segments 154 of the reinforcement members 150 have been perforated, the core 16 is bonded to the sub-assembly 100a, and outer skin 14 is bonded to the core 16 using a suitable adhesive. In bonding the core 16 to the sub-assembly 100a, the core 16 is bonded to the reinforcement members 50 and the inner skin 12. After the core 16 is bonded to the sub-assembly 100a, the radially innermost surface 14a of the outer skin 14 is bonded to the core 16 and the reinforcement members 150, thereby completing the barrel 100.

According to an alternative embodiment, the inner skin 12, outer skin 14, cellular core 16 and reinforcement members 150 may be bonded together in one step to form the barrel 100, and the barrel 100 may thereafter be allowed to cure. The inner skin 12 and the first end segment 154 of each reinforcement member 150 may then be perforated together so as to have aligned perforations 18, 158.

Figure 9:
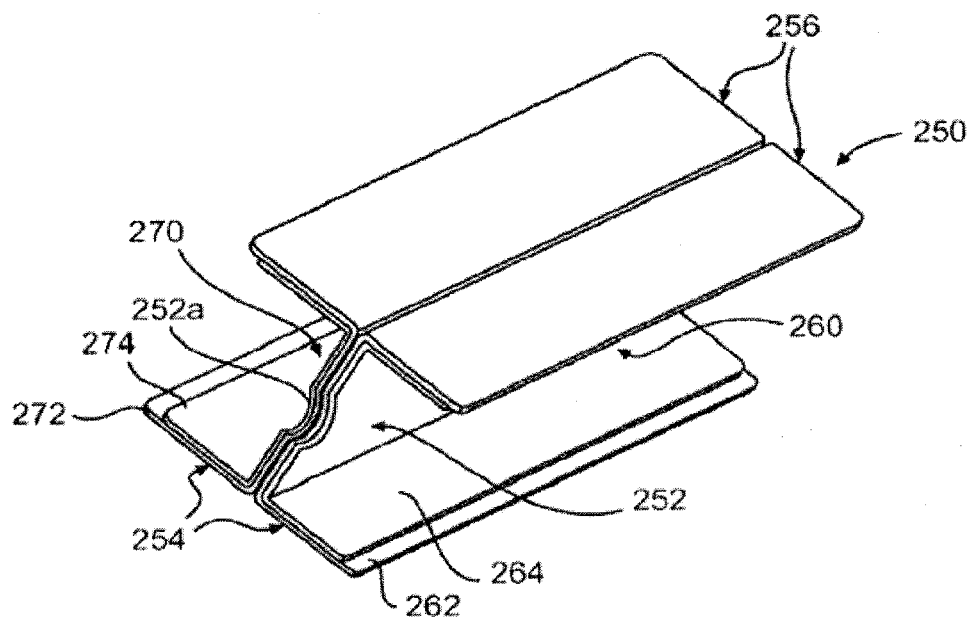
FIG. 9 is a perspective view showing a crack and delamination stopper according to yet another embodiment of the invention.
Figure 10:
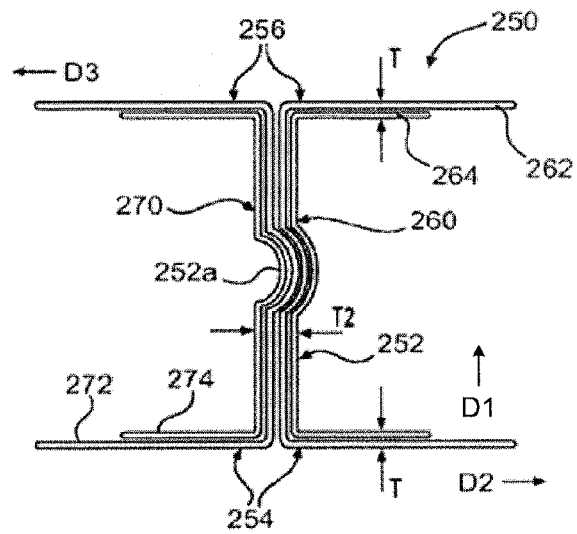
FIG. 10 is a cross-sectional view of the crack and delamination stopper of FIG. 9.

A crack and delamination stopper or reinforcement member 250 according to another embodiment is shown in FIGS. 9 and 10. When assembled from its components, the reinforcement member 250 has a substantially I-shaped cross-section in the axial direction of the barrel 200 and includes an elongate central segment 252 extending in a first direction D1, a first end segment 254 extending transversely to the central segment 252 in directions D2, D3, and a second end segment 256 extending from a second end of the central segment 252 transversely in directions D2, D3 to the central segment 252. The central segment 252 may include a bowed region 252a having an arcuate cross-section.

According to a preferred embodiment, the reinforcement member 250 is provided as a pre-cured composite body constructed of graphite-epoxy or the like. As shown in FIGS. 9 and 10, the reinforcement member 250 is constructed of a first substantially C-shaped member 260 and a second substantially C-shaped member 270 joined together in back-to-back relationship. The first substantially C-shaped member 260 is formed from two similarly shaped plies 262, 264 that are bonded together. Similarly, the second substantially C-shaped member 270 is formed from two similarly shaped plies 272, 274 that are bonded together. In order to promote more secure bonding within the barrel 200, the plies 262, 272 extend further in the directions D2, D3 than the plies 264, 274. The bowed region 252a is formed from bowed regions in the plies 262, 264 and 272, 274 that assist in alignment of the plies.

Figure 11:
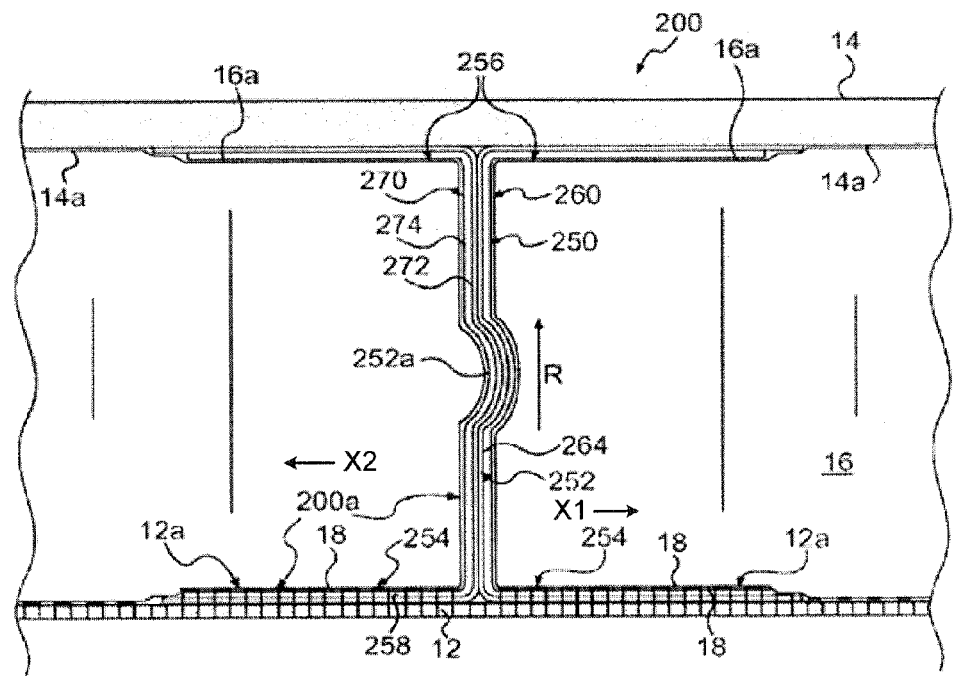
FIG. 11 is an enlarged cross-sectional view showing an acoustic inner barrel including the crack and delamination stopper of FIG. 9.

Referring to FIG. 11, the end segments 254, 256 may generally have a thickness T (in the direction perpendicular to the length of the respective segment 254/256) of about 0.5 inches (1.27 cm), while the central segment 252 may have a thickness T2 (in the direction perpendicular to the length of the segment 252) of about 1 inch (2.54 cm). However, the thickness of the reinforcement member 250 may vary as required. The axial length of the reinforcement member 250 (in the direction L shown in FIG. 1) may be approximately equal to the axial length of the core 16.

As is the case with the preceding embodiments, it should be understood that the reinforcement member 250 may have a different number of multiple plies, the plies may be joined by means other than bonding, or the reinforcement member may have unitary one-piece construction.

FIG. 11 illustrates the construction of the barrel 200 including the reinforcement member 250. As shown in FIG. 11, the central segment 252 of the reinforcement member 250 extends radially in the direction R through the core 16 of the barrel 200, the first end segment 254 of the reinforcement member 250 extends substantially parallel to the inner skin 12 in directions X1, X2 and the second end segment 256 of the channel member 50 extends substantially parallel to the outer skin 14 in directions X1, X2. The first end segment 254 is positioned between opposing layers 12a, 12b of the inner skin 12, and the second end segment 256 is positioned between the radially innermost surface 14a of the outer skin 14 and the radially outermost surface 16a of the core 16. Optionally, the second end portion 256 of the reinforcement member 250 may be positioned between individual layers (not shown) of the outer skin 14. As in the previously discussed barrels 10, 100, it is less preferable to position the second end portion 256 between individual layers of the outer skin 14, as it is desirable that the bond between the reinforcement member 250 and the inner skin 12 be stronger than the bond between the reinforcement member 250 and the outer skin 14. When the reinforcement member 250 is integrated into the barrel 200, the first end segment 254 of the reinforcement member 250 is preferably provided with perforations 258 that are substantially aligned with the perforations 18 in the inner skin 12.

The reinforcement member 250 is integrated into the inner skin 12 by positioning the first end segment 254 between the inner skin layers 12a, 12b such that the layers 12a, 12b lie over the first end segment 254, and applying adhesive to adjacent surfaces of the first end segment 254 and the inner skin layers 12a, 12b. One or more additional reinforcement members 250 may also be integrated into the inner skin 12 at desired locations around the periphery of the inner skin 12. Upon installing the desired number of reinforcement members 250 into the inner skin 12, a sub-assembly 200a including the inner skin 12 and the reinforcement members 250 is formed. The sub-assembly 200a is then allowed to cure. The inner skin 12 and the first end segment 254 of each reinforcement member 250 may then be perforated together so as to have aligned perforations 18, 258. Once the sub-assembly 200a has cured, and the inner skin 12 and the first end segments 254 of the reinforcement members 250 have been perforated, the core 16 is bonded to the sub-assembly 200a. In bonding the core 16 to the sub-assembly 200a, the core 16 is bonded to the reinforcement members 250 and the inner skin 12. After the core 16 is bonded to the sub-assembly 200a, the radially innermost surface 14a of the outer skin 14 is bonded to the core 16 and the reinforcement members 250.

According to an alternative embodiment, the inner skin 12, outer skin 14, cellular core 16 and reinforcement members 250 may be bonded together in one step to form the barrel 200, and the barrel 200 may thereafter be allowed to cure. The inner skin 12 and the first end segment 254 of each reinforcement member 250 may then be perforated together so as to have aligned perforations 18, 258.

Figure 12:
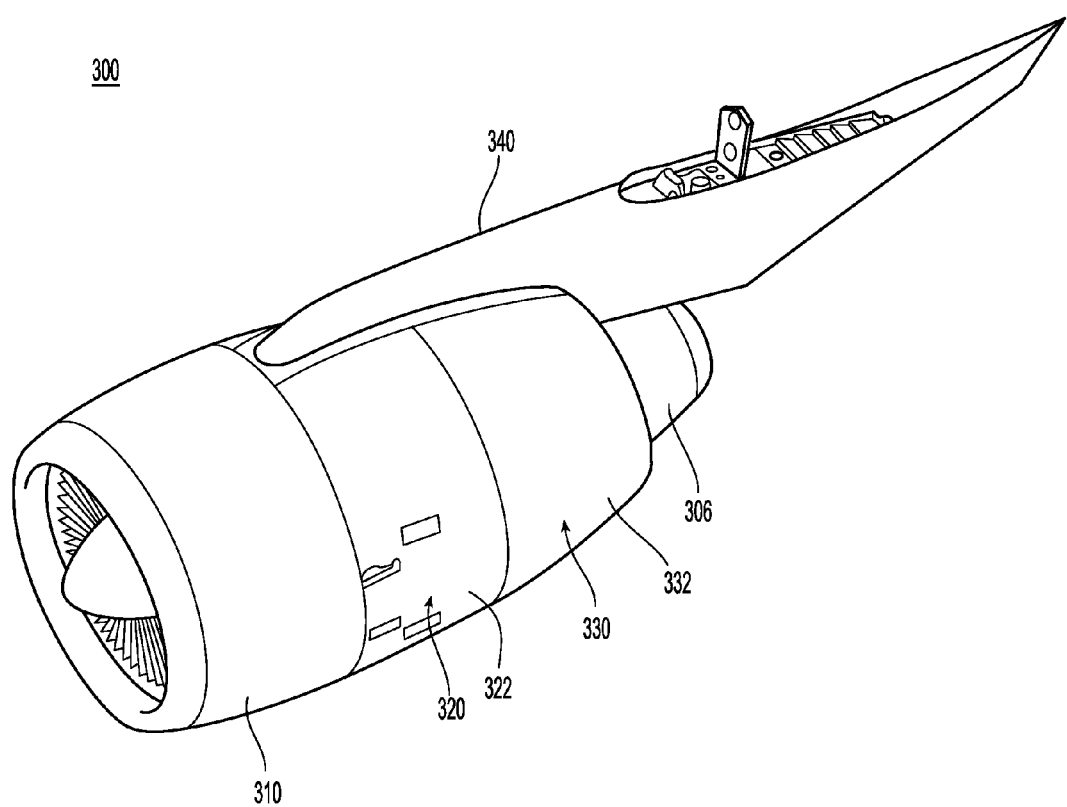
FIG. 12 shows an aircraft propulsion system.
Figure 13:
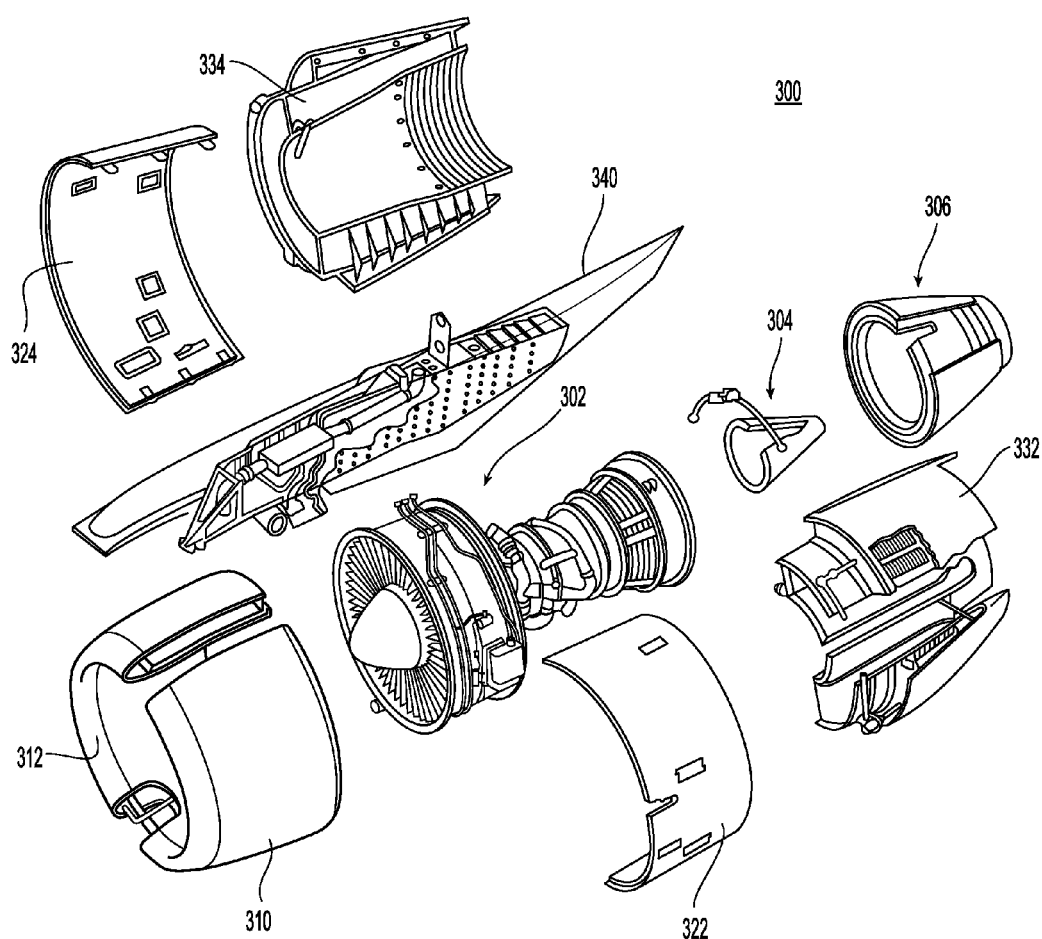
FIG. 13 shows an exploded view the aircraft propulsion system of FIG. 12.

FIG. 12 shows one embodiment of an assembled, complete aircraft propulsion assembly 300 and FIG. 13 shows an exploded view of the aircraft propulsion assembly of FIG. 12. As seen in FIG. 13, the principal components of the aircraft propulsion system include an engine assembly 302 at the tail end of which are an exhaust cone 304 and an exhaust nozzle 306. The forward end of the engine assembly 302 is provided with a nacelle inlet 310 having a nacelle inlet lip 312. It is understood that the nacelle inlet 310 may be of the sort having reinforcement members, as described above. Aft of the nacelle inlet 310 is fan cowl 320 comprising fan cowl halves 322, 324. A thrust reverser 330 comprising thrust reverser halves 332, 334 is aft of the fan cowl 320. Finally, a pylon/strut assembly 340 connects the aforementioned component to a wing of an aircraft.

Figure 14:
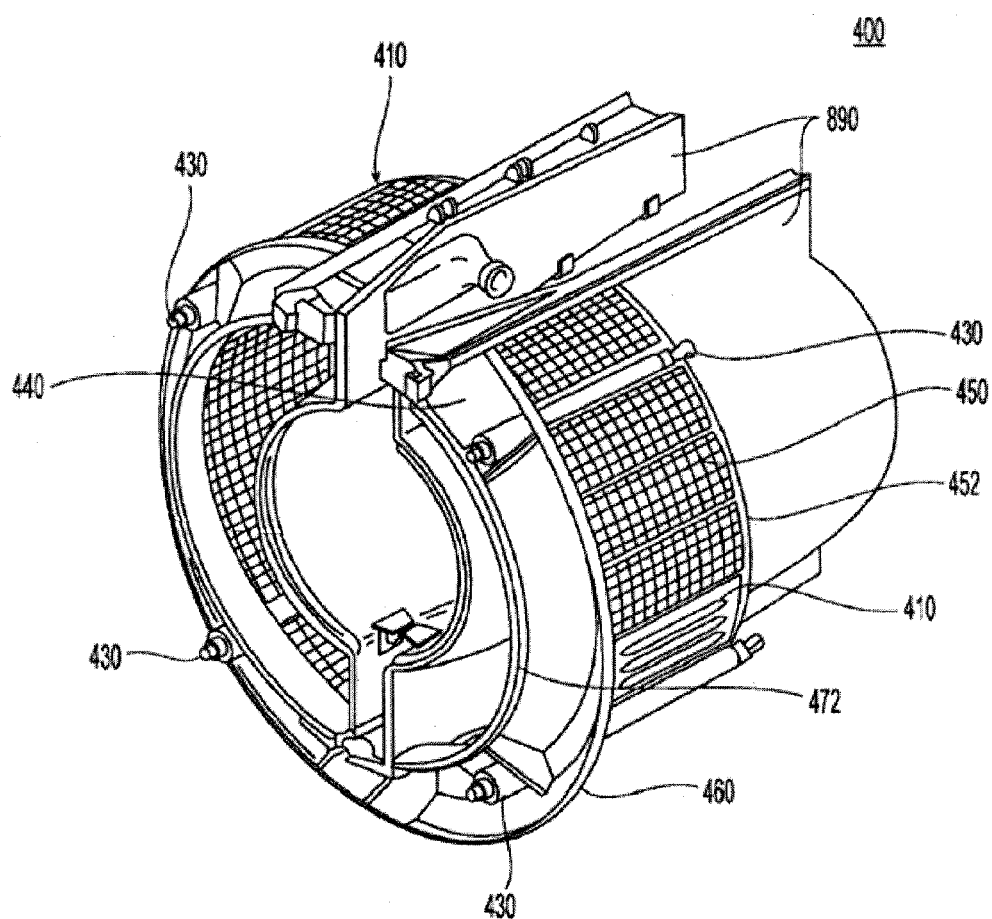
FIG. 14 shows an isometric view of a thrust reverser.
Figure 15:
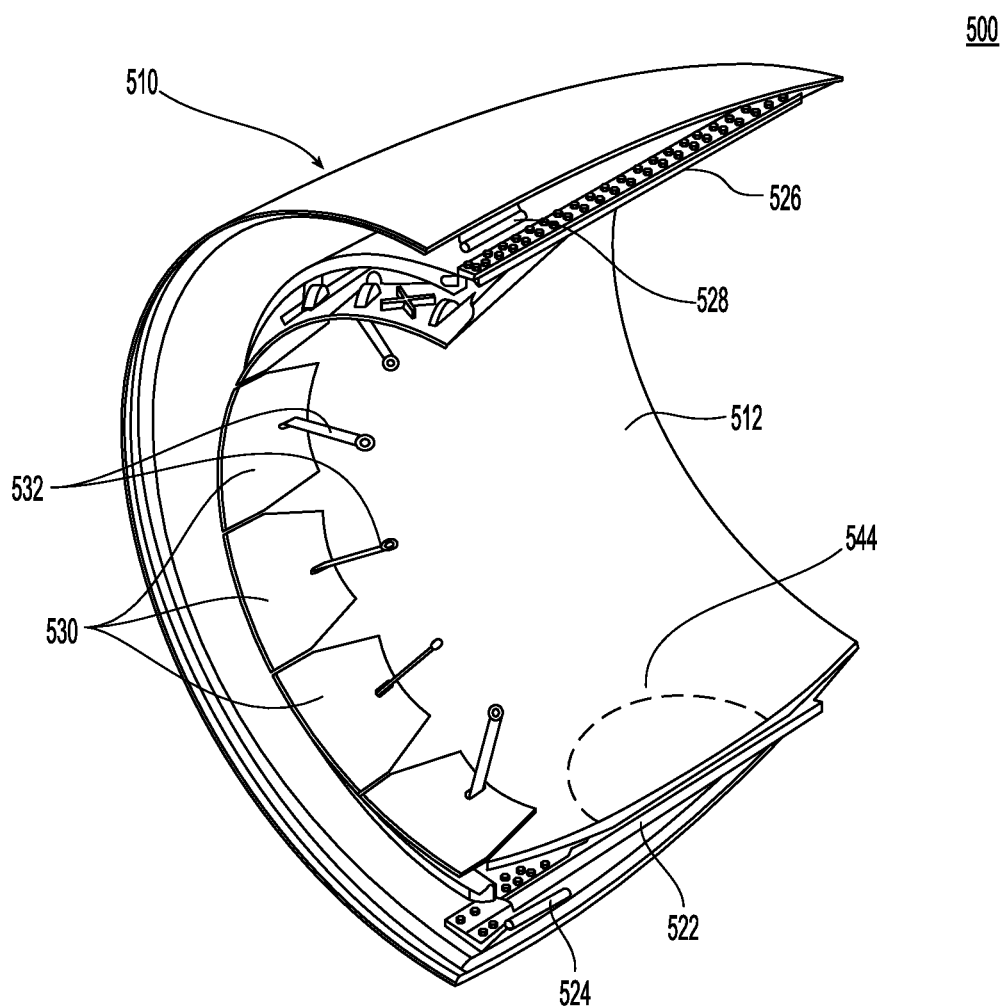
FIG. 15 shows a translating sleeve for a thrust reverser.
Figure 16:
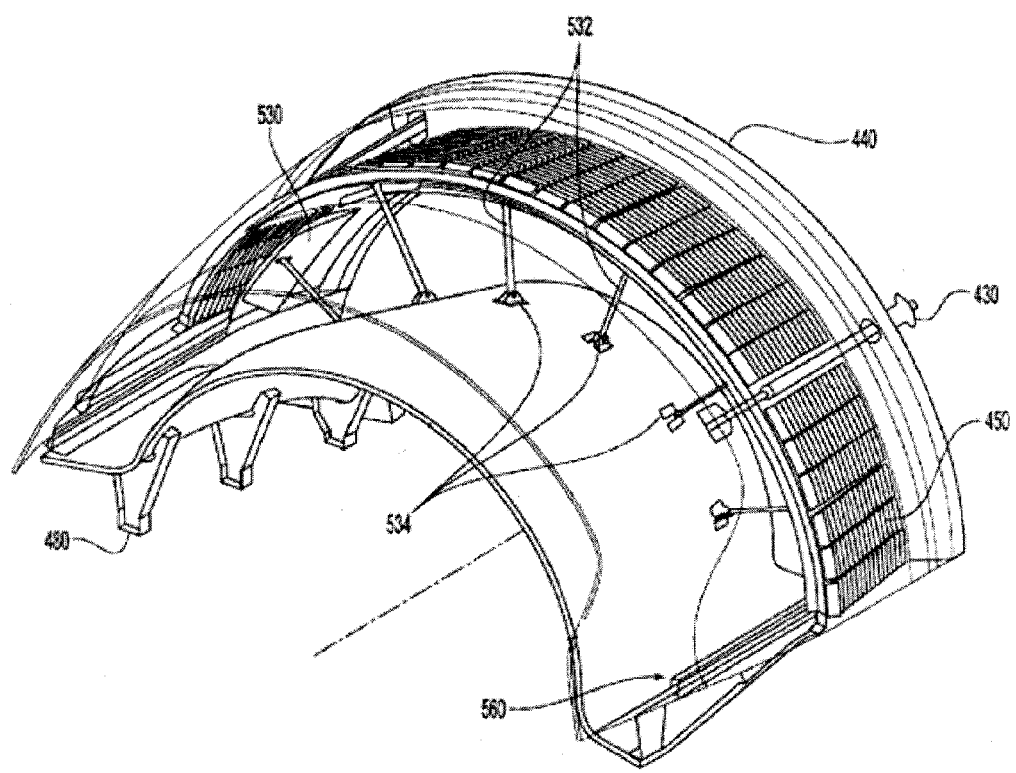
FIG. 16 shows a translating sleeve attached to an inner fixed structure.

FIGS. 14, 15 and 16 show details of a thrust reverser 400 representative of the thrust reverser 330 seen in FIGS. 12 and 13. The thrust reverser 400 includes an outer fixed structure 410, a translating sleeve 500, and an inner fixed structure 810.

The outer fixed structure 410 is provided with such features as a fan cowl land 460, an outer groove 472 mated to the engine assembly 302 and other forward components in the assembled system. Also provided on the outer fixed structure 410 is a torque box assembly 440 and a plurality of actuators 430 which are operatively connected to the translating sleeve 500. Cascades 450, which terminate in the aft direction at an aft cascade attached frame 452, are provided on the outer fixed structure 410 to selectively redirect fan exhaust depending on the mode (forward or reverse) of the thrust reverser 400.

The translating sleeve 500 includes an outer panel assembly 510, an inner panel assembly 512, lower inner and outer sliders 522, 524, and upper inner and outer sliders 526, 528.

An inner circumferential periphery of the sleeve 500 is provided with a plurality of hinged blocker doors 530 arranged side-by-side. Each blocker door 530 is connected via a blocker door link 532 to a hinged mount 534 affixed to an outer portion of the inner fixed structure 810. The translating sleeve 500 is further connected to the inner fixed structure 810 by the lower inner and outer sliders 522, 524 and the upper inner and outer sliders 526, 528 which engage tracks 560 belonging to the inner fixed structure 810. The inner panel assembly 512 is locally flattened in a predetermined region 544 to attach the inner sliders. When the blocker doors 530 are closed (forward thrust mode), they cover the cascades 450 and when the blocker doors 530 are open (reverse thrust mode), the cascades are no longer covered and so permit fan exhaust to pass therethrough.

The translating sleeve 500 moves between a first position in which the thrust reverser 400 is in forward thrust mode and a second position in which the assembly is in the reverse thrust mode. The actuators 430 mounted on the outer fixed structure 410 cause the translating sleeve 500 to move between the first and second positions. In the forward thrust mode, the translating sleeve 500 forms the nacelle external surface and shields the cascades 450 from exhaust gases. In the reverse thrust mode, the translating sleeve 500 slides in the aft direction. This deploys the blocker doors 530, exposes the cascades 450, and redirects fan exhaust in a forward direction.

Prior art thrust reverser inner fixed structures having portions comprising an inner skin, and outer skin and a cellular core, which may be an acoustic cellular core, are known. In such constructions, the inner and outer skins are bonded to the cellular core. However, disbonding of the inner or outer skin from the core has been an issue in the nacelle industry, in some instances resulting in parts of the inner fixed structure detaching and even departing from the aircraft. Disbonding may result from the degradation of the bond line between the cellular core and one or more of the inner skin and outer skin due to long exposure to high temperatures of the sort created by exhaust gases. Regardless of the causes for disbonding, providing a thrust reverser inner fixed structure with reinforcement members, such as those discussed above with respect to an inner barrel, may be one way to mitigate the effects of disbonding with minimal added cost and weight.

Figure 17:
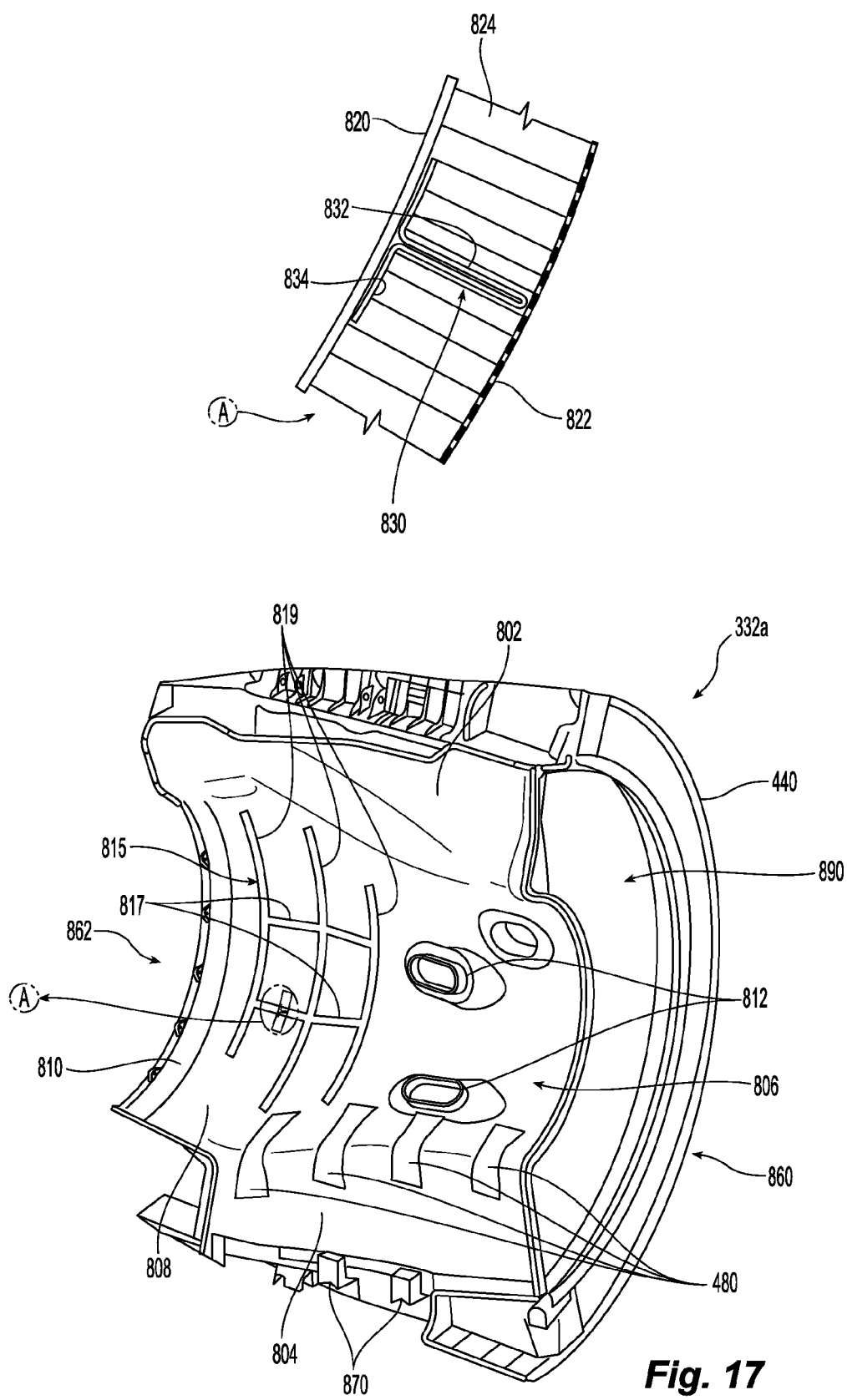
FIG. 17 shows a portion of inner fixed structure having a reinforcement lattice in accordance with one embodiment of the present invention.

FIG. 17 shows a thrust reverser half 332a which exposes one half section 890 ("IFS Section") of an inner fixed structure formed in two "clam-shell" halves, only one clam-shell half 890 being shown. It is understood that the unseen second section is essentially a mirror image of seen section 890. The IFS section has a forward end 860 which faces in the direction of the engine and fan cowl and an aft end 862 which faces in the direction of the exhaust nozzle. The IFS halves 890 are connected together by latches 870 at the bottom and hinged to the pylon 340 at the top. Bumpers 480 provide a structural bridge between the gaps that separates the two IFS halves 890. The structural bridge provides a hoop load path to resist the crushing pressure of the fan air stream upon the barrel sections and bifurcations.

The inner fixed structure seen in FIG. 17 is constructed to encase portions of the engine assembly located between the engine fan case and the nozzle. The inner fixed structure is configured to create an aerodynamically smooth path for air and creates a fire and heat boundary by enclosing portions of the engine assembly.

In one embodiment, the inner fixed structure section 890 is a one-piece honeycomb sandwich comprising an inner skin, an outer skin and a cellular core between the inner and outer skins, all bonded together. The honeycomb sandwich is typically an acoustic structure with an imperforate inner skin 820, a perforated outer skin 822, and a cellular core 824 suitable for use in acoustic applications. The inner skin 820 may be formed from a metallic or a graphite composite material; the outer skin may also be formed from a metallic or graphite composite material; and the cellular core 824 may be formed from a metallic material such as aluminum or titanium, or may even be formed from a non-metallic material, such as a graphite composite material.

The inner fixed structure section 890 has an upper bifurcation wall portion 802, a lower bifurcation wall portion 804 and a barrel portion 806 formed between the two wall portions 802, 804. The honeycomb sandwich is acoustic wherever possible to control noise, but is interrupted by a number of structures and formations such as cooling holes 812, bumpers 480, latches 870, mounting members and the like.

Aft of its forward end 860 where it interfaces with the fan section, the diameter of the barrel portion 806 increases to form an enlarged barrel portion 808 of suitable size and shape to enclose the rear engine mounts and the turbine section of the engine. The barrel portion 806 then decreases in diameter to wrap around the forward portion of the exhaust nozzle 306.

To help prevent disbonding, the honeycomb sandwich, in at least the enlarged barrel portion 808 of the inner fixed structure section 890 is provided with a reinforcement lattice 815. In some embodiments, the reinforcement lattice is provided only in the enlarged barrel portion 808. The reinforcement lattice 815 comprises a plurality of reinforcement members 817, 819 extending in a thickness direction through the cellular core 824 between the "back" or inner skin 820 and the outer skin 822. Reinforcement members 817, which extend in a first direction, constitute a first set of reinforcement members, while reinforcement members 819, which extend in a second direction, constitute a second set of reinforcement members, the two directions intersecting.

Each of the reinforcement members also extends in lateral direction through the cellular core 824, the lateral directions being perpendicular to the thickness direction of the cellular core 824. The lateral directions associated with a first set of reinforcement members 817 intersect lateral directions associated with a second set of reinforcement members 819 to thereby form the reinforcement lattice 815.

As seen with the reinforcement lattice 815 of FIG. 17, the reinforcement members themselves may intersect. In some embodiments, at the intersections, a first reinforcement member may be broken while a second reinforcement member continues unbroken. In such case, the broken reinforcement member may be bonded to transversely extending opposite side walls of the unbroken reinforcement member. In other embodiments, at the intersections, special "cross-shaped" intersection members may be provided, with the "broken" ends of the two intersecting reinforcement members being bonded to legs of the "cross-shaped" intersection members."

As seen in the embodiment of FIG. 17, at least two longitudinal reinforcement members 817 extend along a longitudinal direction of the inner fixed structure section 890, while at least two circumferential reinforcement members 819 extend along a circumferential direction of the inner fixed structure section 890. Furthermore, as seen in this figure, the longitudinal reinforcement members 817 intersect the circumferential reinforcement members 819 to form the reinforcement lattice 815.

It is understood that in a complete thrust reverser inner fixed structure 810, two complementary sections 890 are arranged in a clamshell configuration, each section including such a reinforcement lattice 815. It is further understood that one may instead form a one-piece thrust reverser inner fixed structure (not shown) which may have two such reinforcement lattices 815 facing each other in the enlarged barrel portion 808.

Figure 18A:
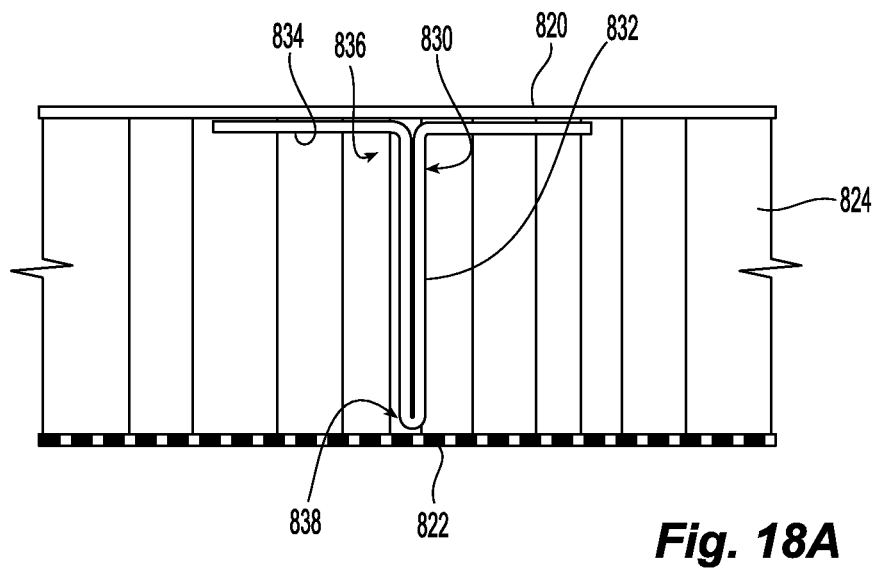
FIGS. 18A and 18B show exemplary cross-sections of a portion of the reinforcement lattice of FIG. 17.
Figure 18B:
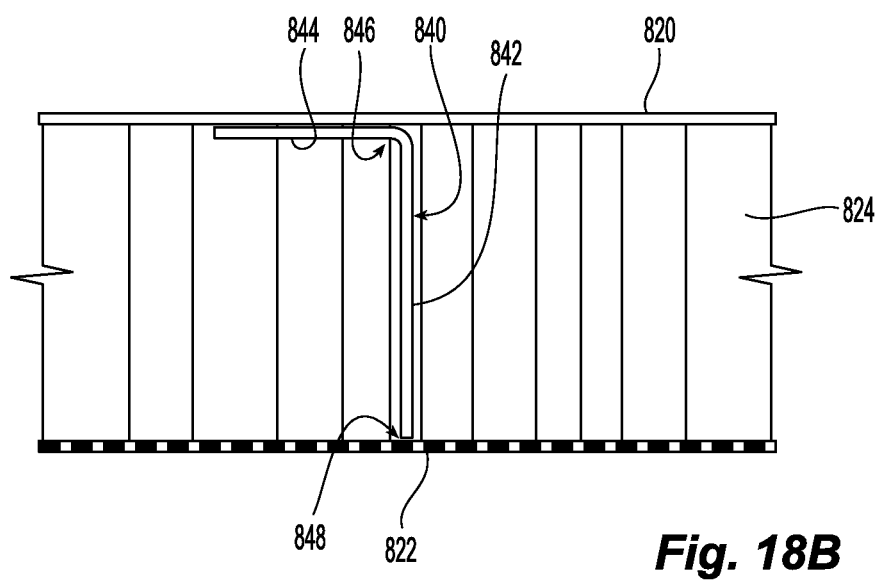

As seen in FIGS. 18A, and 18B, the reinforcement members 830, 840 may take on different cross-sectional shapes.

As seen in FIG. 18A, T-shaped cross-sectional member 830 has a central segment 832 having a first end 836 and a second end 838. The central segment 832 extends radially through the cellular core 824 and is connected at its first end 836 to a first end segment 834. The first end segment 834 extends substantially parallel to the inner skin 820 and is bonded thereto, such as in the manner described previously with respect to the inner barrel. In addition, the central segment 832 is bonded to cellular core 824 by adhesive bonding, by diffusion bonding, or in some other manner. In the case of adhesive bonding, a foam adhesive may be employed. Thus, the central segment 832 is anchored to the cellular core 824 while the first end segment 834 is anchored to the inner skin 820. However the outer skin 822 typically is not bonded to the reinforcement member 830 and, in some embodiments the second end 838 of the central segment 832 may not even extend to the outer skin 822 and so the reinforcement member 830 may be spaced apart therefrom.

In some embodiments, the central segment 832 of the T-shaped cross-sectional member has a thickness of about 0.044 inches while the first end segment 834 of the T-shaped cross-sectional member has a thickness of about 0.022 inches. Thus, the T-shaped cross-sectional member 830 may be formed by folding a sheet of material having a thickness of about 0.022 inches on itself to form the central segment 832, and further fold the ends outwardly to create a T-shaped cross-section. The folded sheet may then be pre-cured before incorporation into the cellular core 824. Alternatively, in some embodiments, the folded sheet may be co-cured with the inner and/or outer skins.

As seen in FIG. 18B, L-shaped cross-sectional member 840 has a central segment 842 having a first end 846 and a second end 848. The central segment 842 extends radially through the cellular core 824 and is connected at its first end 846 to a first end segment 844. The first end segment 844 extends substantially parallel to the inner skin 820 and is bonded thereto, such as in the manner described previously with respect to the inner barrel. In addition, the central segment 842 is bonded to cellular core by adhesive bonding, by diffusion bonding, or in some other manner. In the case of adhesive bonding, a foam adhesive may be employed. Thus, the central segment 842 is anchored to the cellular core 824 while the first end segment 844 is anchored to the inner skin 820. However the outer skin 822 typically is not bonded to the reinforcement member 840 and, in some embodiments the second end 848 of the central segment 842 may not even extend to the outer skin 822 and so the reinforcement member 840 may be spaced apart therefrom.

In some embodiments, the central segment 842 and the first end segment 844 of the L-shaped member both have a thickness of 0.022 inches. Thus, the L-shaped cross-sectional member 840 may be formed by folding a sheet of material having a thickness of about 0.022 inches to create an L-shaped cross-section. The folded sheet may then be pre-cured before incorporation into the cellular core 824. Alternatively, in some embodiments, the folded sheet may be co-cured with the inner and/or outer skins.

While FIGS. 18A and 18B show cross-sections of two specific embodiments of reinforcement members, it is understood that reinforcement members may have some other cross-section, such as an I-shape, a C-shape, a Z-shape, as described above. Typically, in all such embodiments, the first end segment is bonded to the inner skin and the central segment is bonded to the cellular core. However, the outer skin may not be bonded to the reinforcement member, even though the second end of the central segment of the reinforcement member is proximate to an inner surface of the outer skin. In such case, the "second end segment" proximate the second end of the central section is adhesively anchored to the core 824, thereby providing additional surface area to resist disbonding.

The embodiments disclosed herein improve the fly-home capability of aircraft during blade-out events, disbonding events and other events that may inflict damage on aircraft propulsion system components, such as the acoustic inner barrel of an aircraft engine nacelle or the inner fixed structure of a thrust reverser. When such an event severely impacts such a component, the disclosed reinforcement members function to limit crack propagation and/or disbonding. And due to their design and orientation, the reinforcement members also should not significantly affect the sound dampening performance of these components.

The foregoing disclosure provides illustrative embodiments of the invention and is not intended to be limiting. It should be understood that modifications of the disclosed embodiments are possible within the spirit and scope of the invention, and the invention should be construed to encompass such modifications.

What is claimed is:

1. A thrust reverser inner fixed structure, comprising:
an inner skin;
an outer skin;
a cellular core disposed between the inner skin and the outer skin; and
a reinforcement lattice comprising a plurality of reinforcement members extending in a thickness direction through the cellular core between the inner skin and the outer skin configured to reduce at least one of cracking or delamination of the inner fixed structure,
wherein each of the reinforcement members also extends in lateral direction of the cellular core, lateral directions associated with a first set of reinforcement members intersecting lateral directions associated with a second set of reinforcement members to thereby form the reinforcement lattice; and
wherein the reinforcement lattice is provided only in an enlarged barrel portion of the inner fixed structure, the enlarged barrel portion being located between an upper bifurcation wall portion and a lower bifurcation wall portion of the inner fixed structure, wherein each reinforcement member comprises:
a central segment extending radially through the cellular core, the central segment having a first end and a second end; and
a first end segment extending from the first end of the central segment substantially parallel to the inner skin and bonded to the inner skin, wherein the second end of the central segment abuts the outer skin, the outer skin is not bonded to the second end, wherein the outer skin is free from bonding to any of the reinforcement members.

2. The thrust reverser inner fixed structure according to claim 1, wherein: each of the inner skin, the outer skin, the cellular core and the reinforcement members is constructed from a graphite composite material.

3. The thrust reverser inner fixed structure according to claim 1, wherein: at least two reinforcement members belonging to the first set intersect at least two reinforcement members belonging to the second set.

4. The thrust reverser inner fixed structure according to claim 1, comprising:
- at least two longitudinal reinforcement members which extend along a longitudinal direction of the inner fixed structure; and
- at least two circumferential reinforcement members which extend along a circumferential direction of the inner fixed structure;
- wherein: the at least two longitudinal reinforcement members intersect the at least two circumferential reinforcement members.

5. The thrust reverser inner fixed structure according to claim 1, comprising two complementary inner fixed structure sections arranged in a clamshell configuration, each inner fixed structure section including:
- at least two reinforcement members which extend along a first lateral direction; and
- at least two reinforcement members which extend along a second lateral direction.

6. The thrust reverser inner fixed structure according to claim 1, wherein:
- the outer skin is perforated;
- the inner skin is imperforate;
- the cellular core is bonded to both the inner and outer skins; and
- the central segment is bonded along at least a portion of its length to the cellular core.

7. The thrust reverser inner fixed structure according to claim 6, wherein:
- the first end segment is adhesively bonded to the inner skin; and
- the central segment is adhesively bonded to the cellular core.

8. The thrust reverser inner fixed structure according to claim 6, wherein: each reinforcement member has a cross section in a radial direction through the inner fixed structure, the cross section having a substantially I-shape or a substantially T-shape.

9. The thrust reverser inner fixed structure according to claim 8, wherein:
- the cross section is a substantially I-shape; and
- the substantially I-shape comprises a first substantially C-shaped member joined to a second substantially C-shaped member in back-to-back relationship.

10. An aircraft propulsion system including an engine and a thrust reverser, wherein: the thrust reverser comprises the thrust reverser inner fixed structure according to claim 1.

11. The aircraft propulsion system according to claim 10, further comprising:
- an engine nacelle having an acoustic inner barrel comprising:
    - an annular inner skin;
    - an annular outer skin;
    - an annular acoustic cellular core disposed between the annular inner skin and the annular outer skin; and
    - at least two reinforcement members extending radially from the annular inner skin, through the acoustic cellular core, and to the annular outer skin, wherein the annular inner skin, the annular outer skin, the acoustic cellular core and the at least two reinforcement members are bonded together to form a 360-degree, one-piece annular structure.

* * * * *